United States Patent
Saito et al.

(10) Patent No.: US 10,056,793 B2
(45) Date of Patent: Aug. 21, 2018

(54) STATOR INCLUDING INTEGRATED CORES AND HOLDER

(71) Applicant: HONDA MOTOR CO., LTD., Tokyo (JP)

(72) Inventors: Masafumi Saito, Tochigi (JP); Eishi Yoshida, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 208 days.

(21) Appl. No.: 14/905,436

(22) PCT Filed: May 29, 2014

(86) PCT No.: PCT/JP2014/064272
§ 371 (c)(1),
(2) Date: Jan. 15, 2016

(87) PCT Pub. No.: WO2015/008544
PCT Pub. Date: Jan. 22, 2015

(65) Prior Publication Data
US 2016/0172910 A1 Jun. 16, 2016

(30) Foreign Application Priority Data

Jul. 19, 2013 (JP) .................. 2013-151122

(51) Int. Cl.
*H02K 1/18* (2006.01)
*H02K 1/14* (2006.01)
*H02K 15/02* (2006.01)

(52) U.S. Cl.
CPC ............ *H02K 1/185* (2013.01); *H02K 1/148* (2013.01); *H02K 15/022* (2013.01)

(58) Field of Classification Search
CPC .............................. H02K 1/185; H02K 1/148

USPC .... 310/216.135, 216.129, 216.113, 216.008, 310/216.009
See application file for complete search history.

(56) References Cited

U.S. PATENT DOCUMENTS

| 7,567,010 B1* | 7/2009 | Farnia | H02K 1/148 310/216.135 |
|---|---|---|---|
| 2010/0213788 A1* | 8/2010 | Guttenberger | H02K 1/148 310/216.135 |
| 2013/0033132 A1* | 2/2013 | Jayasoma | H02K 1/148 310/216.113 |

FOREIGN PATENT DOCUMENTS

| JP | 51-023602 | 2/1976 |
|---|---|---|
| JP | 56-048250 U1 | 9/1979 |
| JP | 2003-169431 | 6/2003 |

(Continued)

OTHER PUBLICATIONS

Machine translation of JP 2010233328 A (Oct. 2010).*
(Continued)

*Primary Examiner* — Michael Andrews
(74) *Attorney, Agent, or Firm* — Rankin, Hill & Clark LLP

(57) ABSTRACT

A stator 1 includes a plurality of divided cores 3 constituting a stator core 2, and an annular holder 4 integrally holding the divided cores 3 from the outside. The divided core 3 has an opposite surface 8 opposing an inner circumferential surface of the holder 4. On the opposite surface 8, a recess part 10 extending parallel to a center axis line ax is provided, and on the inner circumferential surface of the holder 4, a projection part 14 entering the recess parts 10 is provided. The projection part 14 comes into contact with an edge of any one of both sidewalls 10a and 10b in the corresponding recess part 10.

3 Claims, 8 Drawing Sheets

(56) References Cited

FOREIGN PATENT DOCUMENTS

| | | |
|---|---|---|
| JP | 2009-060738 | 3/2009 |
| JP | 2010-183792 | 8/2010 |
| JP | 2010-233328 | 10/2010 |
| JP | 2010233328 A * | 10/2010 ............... H02K 1/18 |
| JP | 2011-239577 | 11/2011 |

OTHER PUBLICATIONS

International Search Report, dated Aug. 12, 2014 (Aug. 12, 2014).
Japanese Office Action dated Feb. 28, 2017, 4 pages.

\* cited by examiner

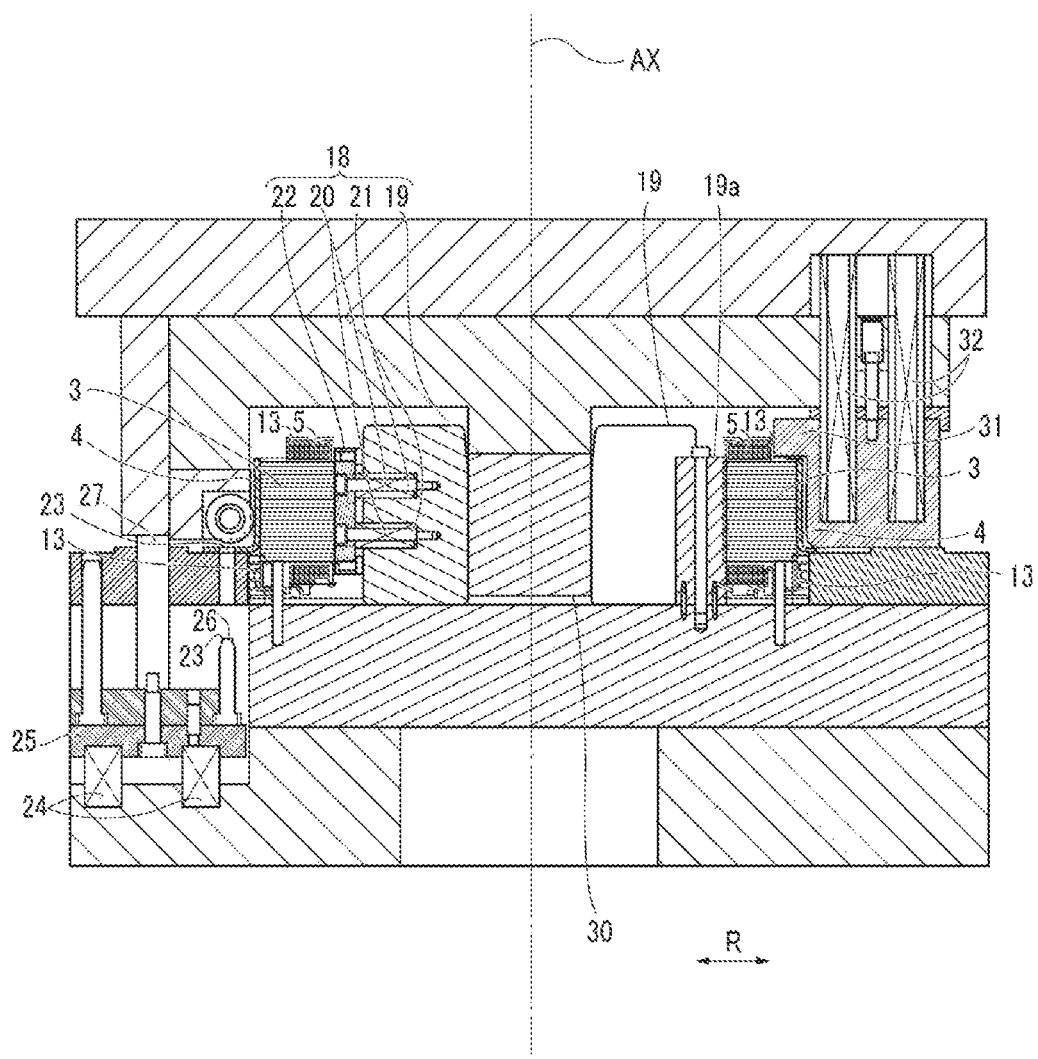

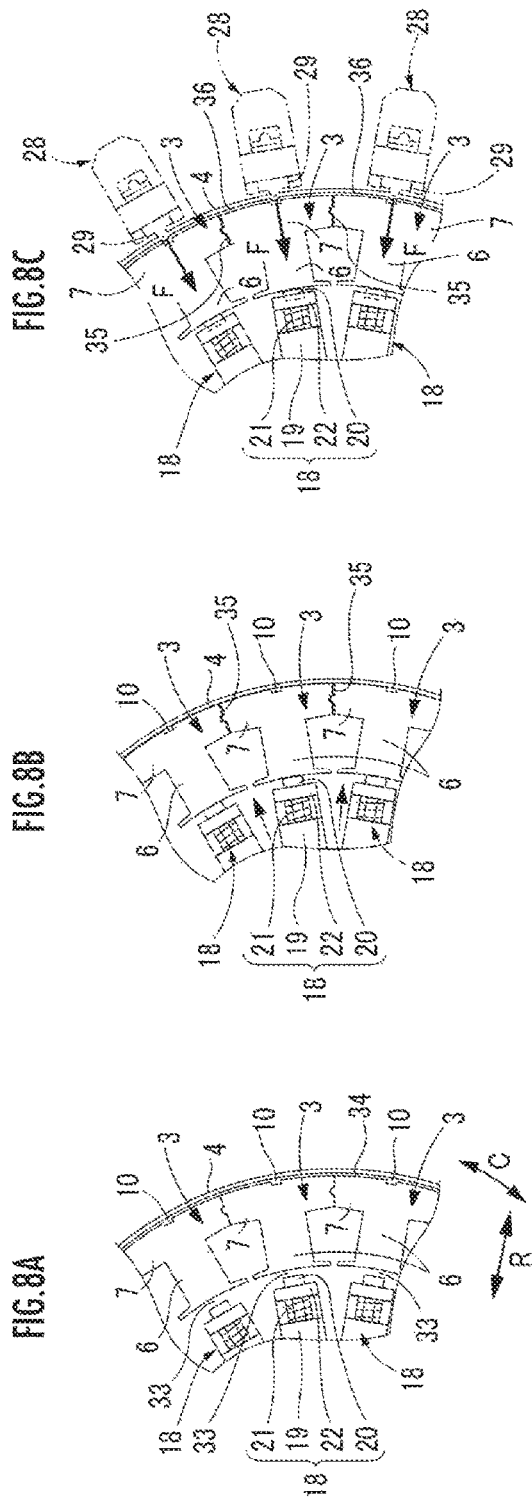

STATOR INCLUDING INTEGRATED CORES AND HOLDER

TECHNICAL FIELD

The present invention relates to a stator in which a plurality of divided cores and an annular holder are integrated together.

BACKGROUND ART

Conventionally, there is known a stator comprising a plurality of divided cores annularly arranged and constituting a stator core, and an annular holder disposed outside the plurality of divided cores and integrally holding the plurality of divided cores (for example, refer to Patent Literature 1).

In the stator of Patent Literature 1, the divided cores and the holder have recess parts and projection parts extending parallel to the center axis line of the stator, respectively. Further, when the divided cores and the holder are integrated together to form the stator, the holder is attached onto the divided cores by loosely fitting the projection parts into the recess parts, and then, the projection parts are deformed by punching. Thus, since the gaps between the recess parts and the projection parts are filled, which further generates residual stress, the stator in which the divided cores and the holder are firmly fasten is formed.

The stator of another aspect of Patent Literature 1 is formed by fitting a cylindrical holder onto the outer periphery of the annular arrangement in which the plurality of divided cores are annularly arranged, and pressing the holder from the outer circumferential surface toward the inner circumferential surface with a punch for plastic deformation or the like. In this case, pressing with the punch or the like causes the material of the holder to enter the grooves of the divided cores and the like, and the divided cores and the holder to be integrated together.

Such a stator has sufficient connection strength between the divided cores and the holder in the case where it is used for a small motor such as a driving motor for hard disks. Nevertheless, since, in the case where large torque is given thereto as in a driving motor for vehicles or the like, fixing strength of the divided cores with respect to the holder is not sufficient, there is a concern that the divided cores are disassembled from the holder.

Therefore, typically in the case of a stator used for a driving motor of vehicles, the stator is formed by press-fitting or shrink-fitting the holder onto the outer circumferential surface of the annular arrangement of the divided cores, and fastening the annular arrangement with the holder under strong force. Thus, since sufficient fixing strength of the divided cores with respect to the holder can be obtained, the stator core can be prevented from getting out of the holder under large torque.

CITATION LIST

Patent Literature

Patent Literature 1: Japanese Patent Laid-Open No. 2003-169431

SUMMARY OF INVENTION

Technical Problem

However, in the case where the stator is formed by press-fitting the holder, the following problem may be caused. Namely, there is a concern of occurrence of shavings by the outer circumferential surface of the annular arrangement shaved by the holder when press-fitting the holder onto the annular arrangement of the divided cores. Due to this countermeasures such as sucking up the shavings with a suction machine or the similar ones are required.

Moreover, since the holder is typically made by press molding and the accuracy in dimensions is not so high, a fastening margin in press-fitting onto the annular arrangement is not constant, and fastening load easily suffers variation. Due to this, since management of the accuracy in dimensions of the holders used is required, as a result, the yield of the holders is deteriorated.

Furthermore, the divided cores are typically formed by stacking electromagnetic steel sheets. Due to this, there is a concern that the electromagnetic steel sheets are deformed due to the load in the direction along the planes of the electromagnetic steel sheets at the time of press-fitting the holder, and as a result, iron loss in the stator core increases.

On the other hand, in the case of connecting the holder onto the annular arrangement of the divided cores by shrink-fitting, means and steps for heating and cooling the holder are required.

An object of the present invention is to provide a stator which can be manufactured in a simple step and in which the divided cores and the holder are firmly integrated together without requiring countermeasures of sucking up shavings and without the yield or the performance deteriorating.

Solution to Problem

A stator of the present invention comprises a plurality of divided cores annularly arranged and forming a stator core, and an annular holder arranged outside the stator core and integrally holding the plurality of divided cores, wherein each of the divided cores has an opposite surface opposing an inner circumferential surface of the holder and a joint surface provided to join the neighboring divided cores, a recess part extending parallel to a center axis line of the stator core is provided on the opposite surface, a projection part entering the recess part is provided on the inner circumferential surface of the holder, and the projection part is formed so as to come into contact along an edge, on the holder side, of a sidewall inside the corresponding recess part.

In the present invention, since the recess part of the divided core and the projection part of the holder come into contact linearly with the sidewall of the recess part, the divided cores and the holder are firmly connected especially in the circumferential direction of the holder. Therefore, even when large torque is given to the divided cores, the divided cores do not displace from or get out of the holder.

Moreover, the projection parts of the holder can be formed by pressing the holder from the outside for plastic deformation. In this case, in manufacturing the stator, countermeasures of sucking up shavings or steps of heating and cooling the holder is not needed, and fastening force applied to the divided cores by the holder is only needed to be relatively small as compared with the case where the holder is press-fitted or shrink-fitted onto the periphery of the divided cores. Moreover, since high accuracy in dimensions of the holder is not required, the yield of the holders does not deteriorate.

Hence, according to the present invention, there can be provided a stator which can be manufactured in a simple step and in which the divided cores and the holder are firmly integrated together without requiring countermeasures of sucking up shavings and without the yield or the performance deteriorating.

In the present invention, the projection part may be in contact with an edge of one or the other sidewall in a circumferential direction of the stator core among both sidewalls of the corresponding recess part, and the projection parts and the recess parts may be arranged such that the one sidewall and the other sidewall of the recess parts with which the projection parts are in contact are mixed. Due to this, even when torque in any direction of one direction and the other direction in the circumferential direction is exerted on the divided cores, the divided cores can be securely held by the holder without slippage arising between the divided cores and the holder.

In the present invention, a gap may be provided between a portion between each of the recess parts on the opposite surfaces of the neighboring divided cores and the inner circumferential surface of the holder, which opposes the portion. Due to this, since pressing force from the holder is not given to the portion between each of the recess parts on the opposite surfaces of the neighboring divided cores, the performance of the stator can be prevented from deteriorating caused by distortion of the divided cores due to such pressing force.

In the present invention, the divided core may have a teeth part which protrudes from a center part of the stator core in a circumferential direction toward the center axis line of the stator core and whose cross section perpendicular to the center axis line is T-shape, and the recess part may be positioned in a center part of the opposite surface of the divided core in the circumferential direction.

Due to this, since the recess part of the opposite surface of the divided core is positioned at the center of the opposite surface, that is, in the portion where the magnetic flux density is coarse, even when distortion arises near the recess part of the divided core due to the formation of the projection parts of the holder, the performance of the stator can be prevented from deteriorating.

BRIEF DESCRIPTION OF DRAWINGS

FIG. 7 is a cross-sectional view of the stator manufacturing apparatus in FIG. 4 in a further different state.

FIG. 8A to FIG. 8E are diagrams illustrating states of a supporting mechanism, a pressing mechanism, the divided cores and the holder in the stator manufacturing apparatus of FIG. 4, FIG. 8A illustrates a state where an upper jig is positioned at the processing standby position, FIG. 8B a state where the upper jig is positioned at the position in FIG. 6, FIG. 8C a state where the upper jig is positioned in the middle between the positions in FIG. 6 and FIG. 7, FIG. 8D a state where the upper is positioned at the position in FIG. 7, and FIG. 8E a state where the upper jig is returned to the processing standby position.

DESCRIPTION OF EMBODIMENTS

Figure 1:
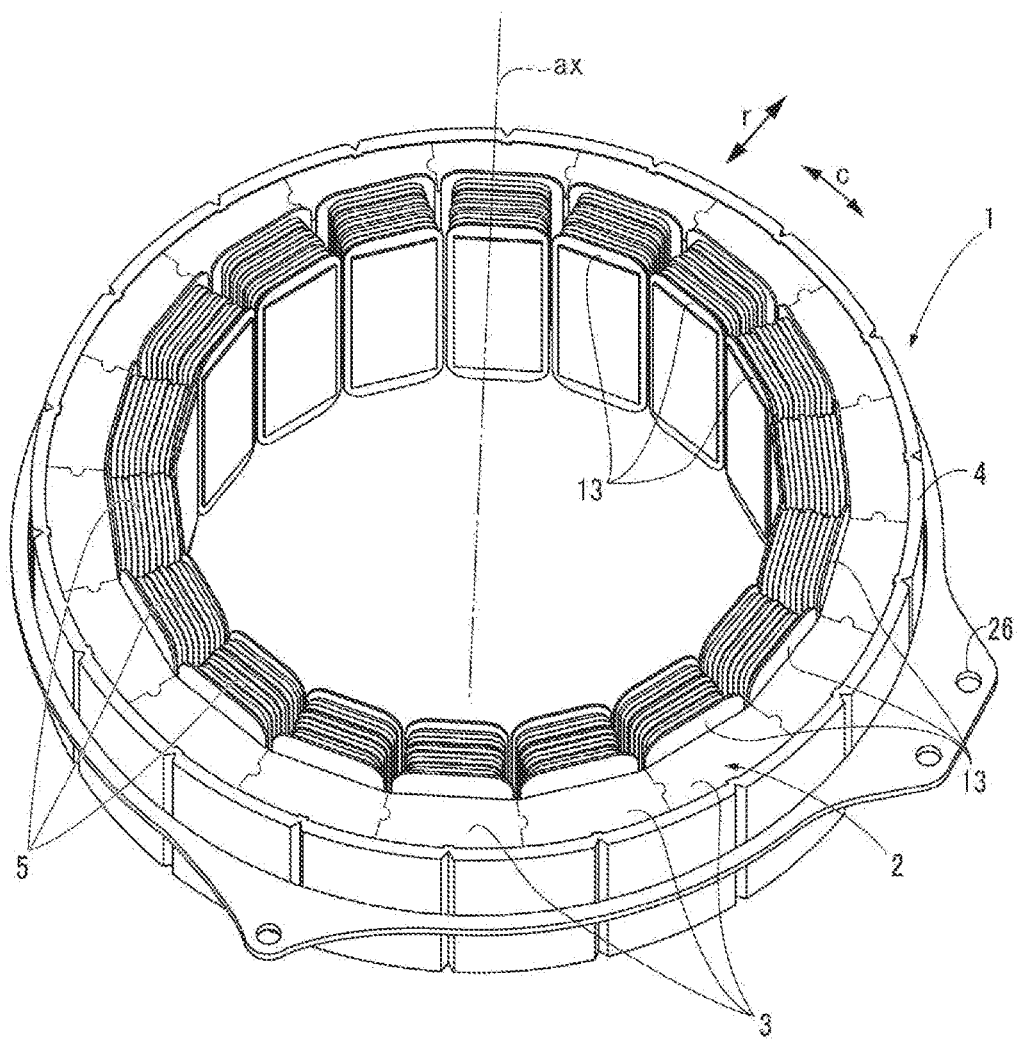
FIG. 1 is a perspective view of a stator according to an embodiment of the present invention.

Hereafter, embodiments of the present invention are described using the drawings. As illustrated in FIG. 1, a stator 1 of an embodiment comprises a plurality of divided cores 3 annularly arranged to constitute a stator core 2, a cylindrical holder 4 disposed outside the arrangement, and stator coils 5 provided on the individual divided cores 3.

The arrangement of the divided cores 3 constitutes a cylindrical outer circumferential surface parallel to a center axis line ax of the stator core 2. The holder 4 has a cylindrical inner circumferential surface opposing the outer circumferential surface, and integrally holds the divided cores 3 via the inner circumferential surface.

Figure 2:
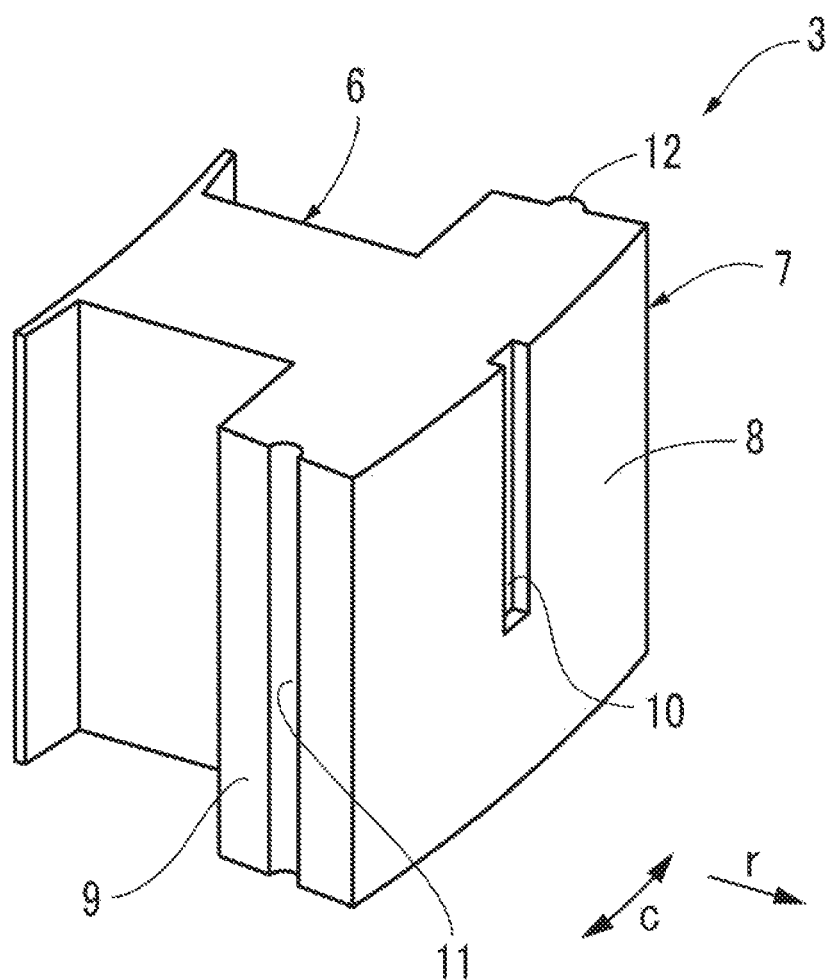
FIG. 2 is a perspective view of a divided core in the stator of FIG. 1.

FIG. 2 is a perspective view of the divided core 3. As illustrated in FIG. 2, the divided core 3 comprises a teeth part 6 on whose outer circumference the above-mentioned stator coil 5 is disposed, and a yoke part 7 magnetically connecting the teeth parts 6 of the neighboring divided cores 3.

The yoke part 7 has a substantially rectangular parallelepiped shape and comprises a partially cylindrical opposite surface 8 opposing the inner circumferential surface of the holder 4, and joint surfaces 9, on both sides, which are provided to face the yoke parts 7 of both neighboring divided cores 3. The neighboring divided cores 3 are connected with their joint surfaces 9 being in contact with each other.

A linear recess part 10 parallel to the center axis line ax is provided on the opposite surface 8 of the divided core 3. The recess part 10 is positioned at the center of the opposite surface 8 in a circumferential direction c of the stator core 2, and is used to connect the divided core 3 and the holder 4.

A recessed groove 11 and a projected ridge 12 which are parallel to the center axis line ax are provided on the joint surfaces 9 on both sides of the divided core 3, respectively. The neighboring divided cores 3 are positioned to each other in a radial direction r around the center axis line ax by the recessed groove 11 of one of them fitted into the projected ridge 12 of the other thereof.

The teeth part 6 extends from the center of the yoke part 7 in the circumferential direction c toward the center axis line ax. Accordingly, a cross section of the divided core 3 perpendicular to the center axis line ax has a substantially T-shape. The stator coil 5 is provided on the outer circumference of the teeth part 6 via an insulator 13 (refer to FIG. 1).

Figure 3:
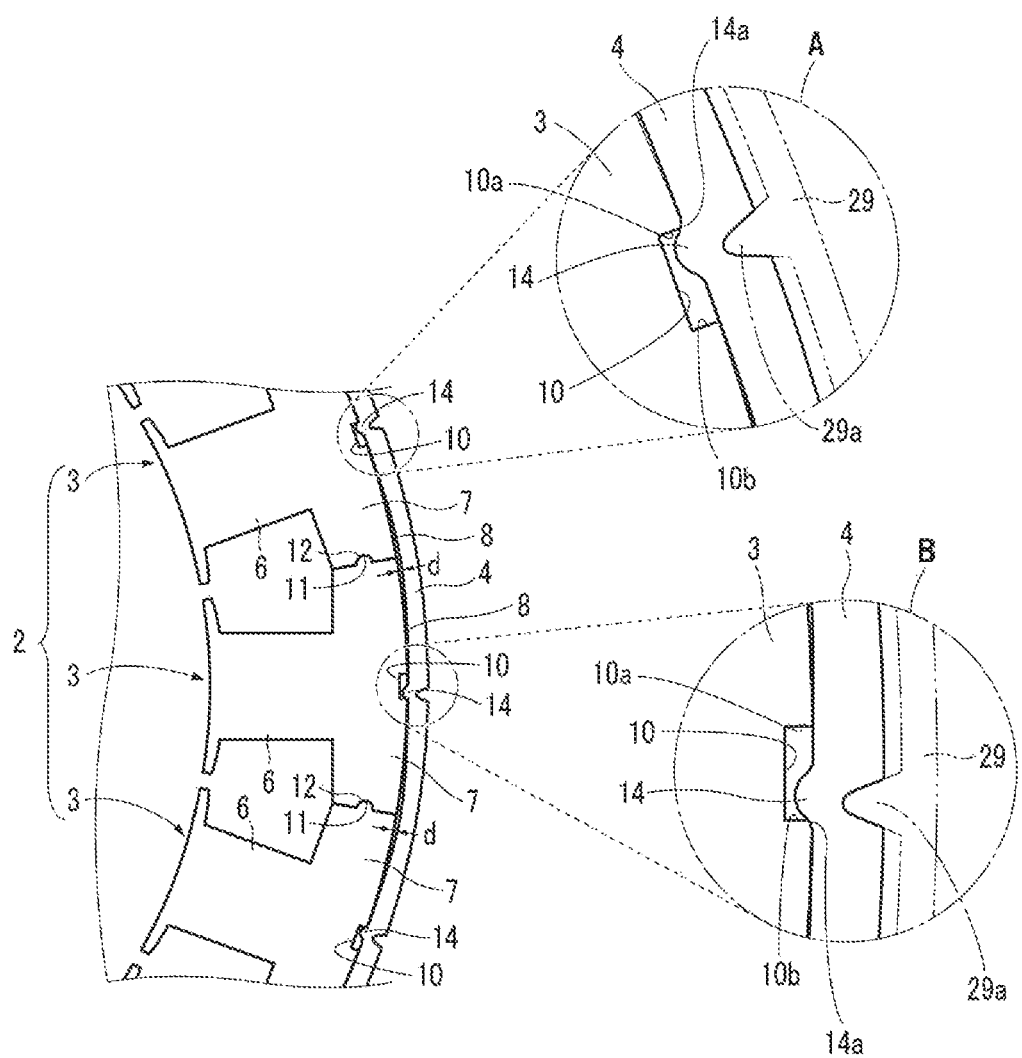
FIG. 3 is a plan view illustrating a situation of connection of the divided cores and a holder in the stator of FIG. 1.

FIG. 3 illustrates a situation of connection of the divided cores 3 and the holder 4. As illustrated in FIG. 3, linear projection parts 14 corresponding to the recess parts 10 of the divided cores 3 are provided on the inner circumferential surface of the holder 4. The projection part 14 linearly comes into contact with an edge, on the holder 4 side, of sidewalls 10a, 10b of the corresponding recess part 10 via a contact part 14a. Here, the sidewall, of the recess part 10, with which the contact part 14a of each projection part 14 is in contact is different depending on the recess part 10.

For example, the sidewalls 10a and 10b with which the corresponding projection parts 14 are in contact are different from each other in the recess parts 10 of each of the neighboring divided cores 3. Namely, as enclosed and illustrated with circles A and B, if the projection part 14 is in contact with one sidewall 10*a* of the recess part 10 of a certain divided core 3, the projection part 14 that corresponds to the recess part 10 of the adjacent divided core 3 is in contact with the other sidewall 10*b* of the relevant recess part 10. In this way, the projection parts 14 and the recess parts 10 are arranged such that one sidewall 10*a* and the other sidewall 10*b* of the recess parts 10 with which the projection parts 14 are in contact, are mixed.

Thus, the divided cores 3 circularly arranged are connected to the holder 4 so as not to rotate relatively with respect to the holder 4. Moreover, the projection parts 14 of the holder 4 are formed by pressing the holder 4 from its outside for plastic deformation, and since the resulting residual stress presses the divided cores 3 in the directions toward the center axis line ax, the divided cores 3 are tightly connected to one another via their joint surfaces 9. Accordingly, the divided cores 3 are integrally immovably held by the holder 4 and form the stator core 2.

Moreover, a gap d is present between a portion between the recess parts 10 on the opposite surfaces 8 of the neighboring yoke parts 7 and the corresponding inner circumferential surface of the holder 4. Thus, since stress toward the center axis line ax is not given to the relevant portion on the yoke parts 7, distortion caused by such stress does not arise.

Notably, pressing the divided cores 3 with the projection parts 14 of the holder 4 is performed on the center portions of the opposite surfaces 8 of the yoke parts 7 in the circumferential direction c. Since these portions have coarse magnetic flux density, even when distortion caused by the pressing force arises in these portions, the performance of the stator 1 is not affected.

Figure 4:
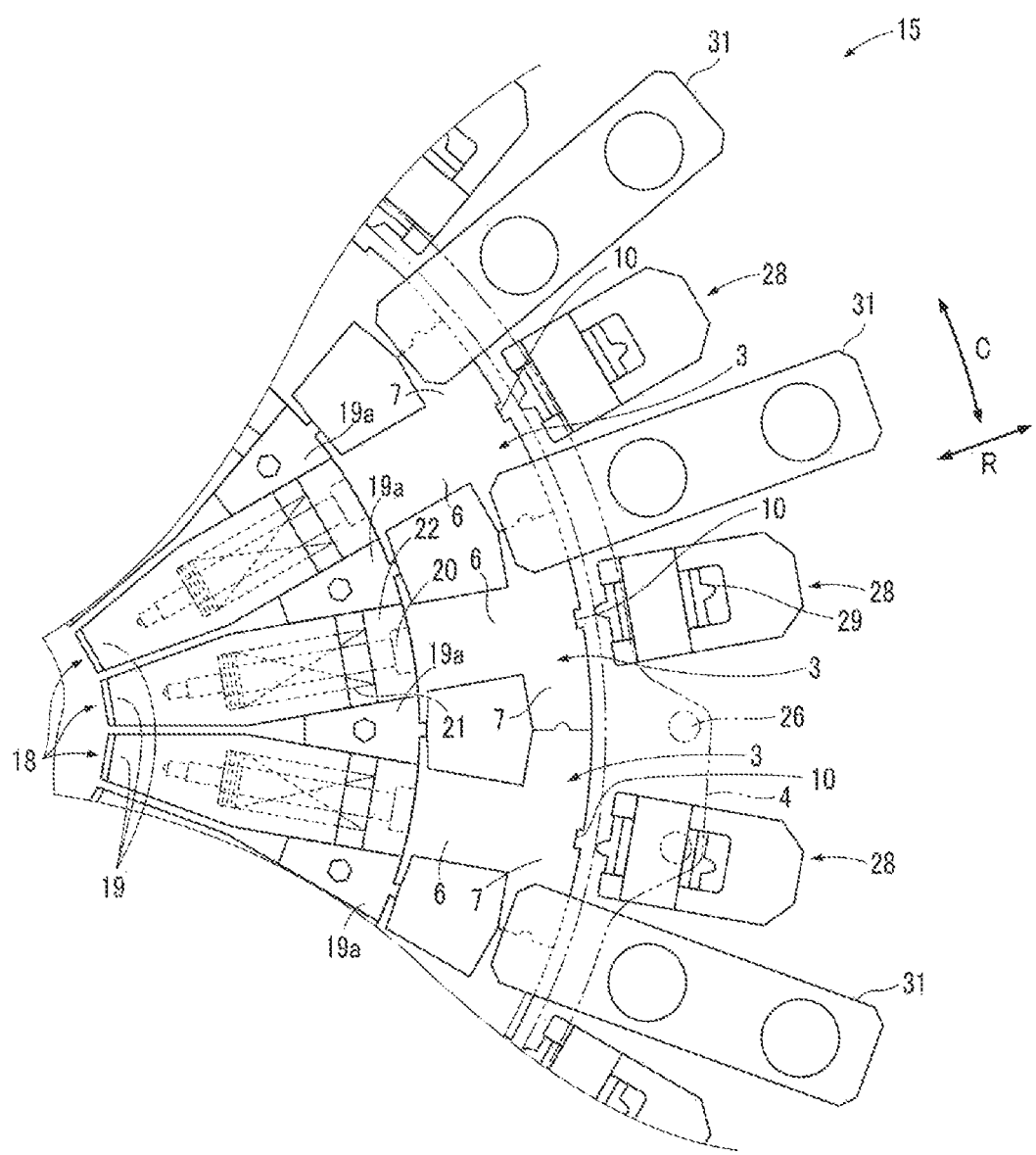
FIG. 4 is a plan view of a stator manufacturing apparatus for manufacturing the stator in FIG. 1.
Figure 5:
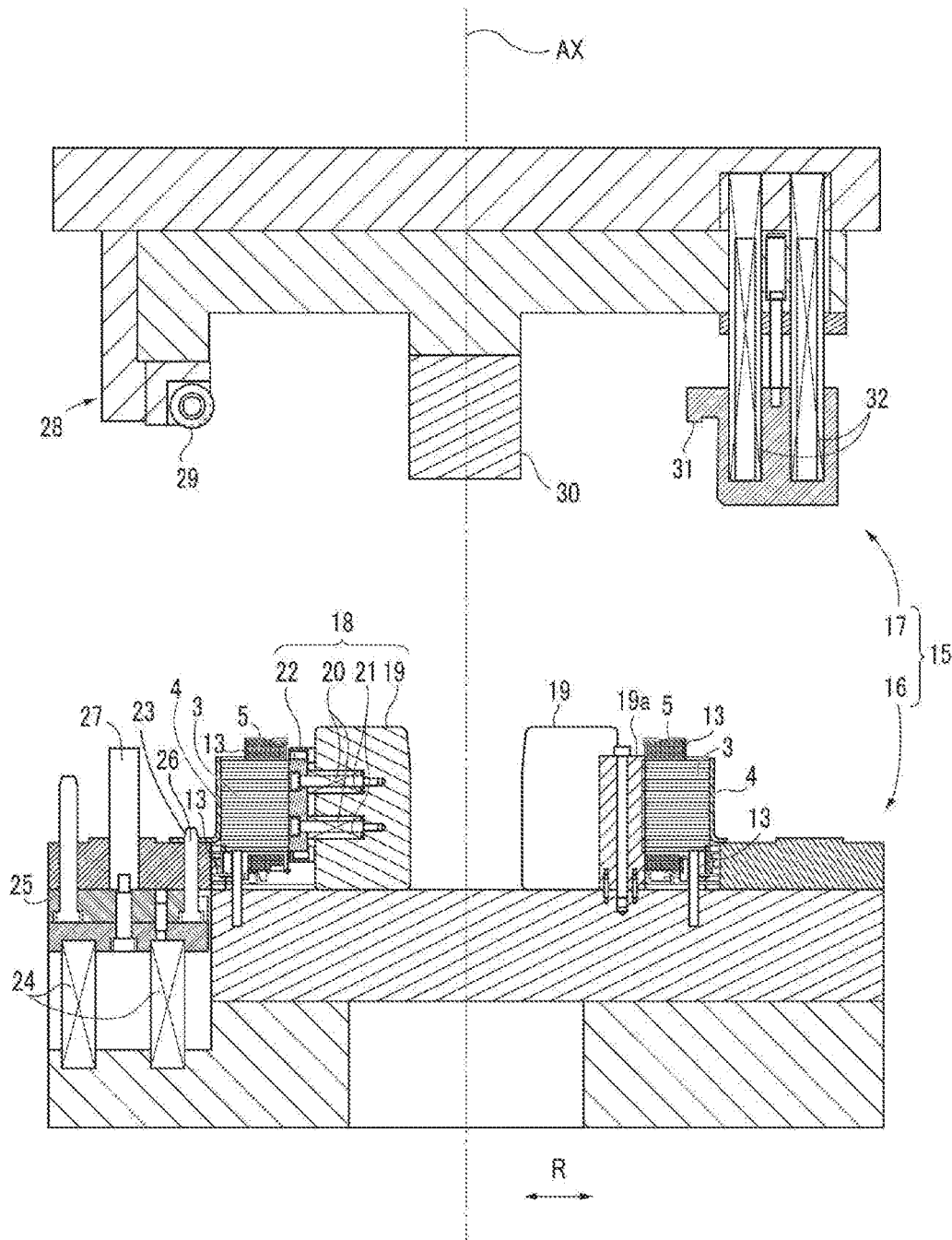
FIG. 5 is across-sectional view of the stator manufacturing apparatus in FIG. 4.

FIG. 4 is a plan view of a stator manufacturing apparatus for manufacturing the stator 1 and FIG. 5 is a cross-sectional view of the stator manufacturing apparatus. The stator manufacturing apparatus 15 is used to form the stator 1 by integrating the plurality of divided cores 3 on which the stator coils 5 are provided with the holder 4 together.

FIG. 4 illustrates only main components of the stator manufacturing apparatus 15 as well as the divided cores 3 and the holder 4 to be integrated together. While these main components are annularly arranged, FIG. 4 illustrates only a part of those. FIG. 5 illustrates cross sections taken along two planes which pass through a center axis line AX of the stator manufacturing apparatus 15 at different angles, in the right and the left relative to the center axis line AX, respectively.

As illustrated in FIG. 5, the stator manufacturing apparatus 15 comprises a lower jig 16 on which the divided cores 3 and the holder 4 are arranged, and an upper jig 17 which is lifted and lowered relative to the lower jig 16 along the center axis line AX. On the lower jig 16, the plurality of divided cores 3 and the holder 4 for integrating these divided cores 3 together are arranged around the center axis line AX, and provided for manufacturing the stator 1.

In the divided cores 3 arranged on the lower jig 16, their yoke parts 7 annularly line up and form the cylindrical outer circumferential surface. The holder 4 is disposed outside the arrangement of the divided cores 3 such that the outer circumferential surface of the divided cores 3 opposes the inner circumferential surface of the holder 4 with a fine gap.

Supporting mechanisms 18 which support the divided cores 3 arranged on the lower jig 16 from the inside toward the outside in radial directions R around the center axis line AX are provided on the lower jig 16. The supporting mechanisms 18 are provided for each of the individual divided cores 3 annularly along the interior of the arrangement of the divided cores 3.

Moreover, the supporting mechanism 18 comprises a holding part 19 supported on the lower jig 16 such that it can slightly move in the radial direction R, and two upper and lower supporting pins 20 which are held by the holding part 19 such that they can move in the radial direction R and support the divided core 3 from the inside in the radial direction R toward the outside in the radial direction R Between the neighboring holding parts 19, a member 19*a* which appropriately holds a distance between the holding parts 19 is provided.

Biasing force outward in the radial direction R is given to the supporting pin 20 by a coil spring 21. The supporting pins 20 and the coil springs 21 constitute a biasing part of the present invention. A preventing member 22 which prevents the divided core 3 from displacing inward from a predetermined position in the radial direction R against the biasing force from the supporting pins 20 is fixed to the holding part 19.

Moreover, two positioning pins 23 for positioning the holder 4 in the occasion when the holder 4 is disposed on the lower jig 16 are provided in the lower jig 16 at respective positions which are substantially symmetrical with respect to the center axis line AX. The positioning pins 23 are moved prior to formation of the projection parts 14 with pressing mechanisms 28 mentioned later, and thereby, the positioning of the holder 4 with the positioning pins 23 is released.

Namely, the positioning pins 23 are provided to stand upward on a movable member 25 which is biased upward by a spring 24 and guided such that it can move in the vertical direction. When the holder 4 is disposed on the lower jig 16, the positioning pins 23 are used to insert their upper end parts into positioning holes 26 of the holder 4 and to perform the positioning of the holder 4. On the movable member 25, protruding members 27 protruding upward of the lower jig 16 are provided.

Accordingly, when the protruding members 27 are pressed downward by the pressing mechanisms 28 mentioned later which descend in the occasion of formation of the projection parts 14, the positioning pins 23 are lowered along with the movable member 25 and get out of the positioning holes 26 of the holder 4, and the positioning of the holder 4 with the positioning pins 23 is released.

Meanwhile, on the upper jig 17, the pressing mechanisms 28 which presses the holder 4 disposed outside the arrangement of the divided cores 3 from its outer circumferential surface side to form the projection parts 14 corresponding to the recess parts 10 of the divided cores 3 on its inner circumferential surface, are provided. The pressing mechanisms 28 are provided for each of the individual divided cores 3 and annularly arranged. The holder 4 and the divided cores 3 are integrated together by caulking joining with the projection parts 14 formed by the pressing mechanisms 28.

The pressing mechanism 28 comprises a pressing roller 29 which is rotated on the outer circumferential surface of the holder 4 for forming the projection part 14. The pressing roller 29 comprises an annular pressing part 29*a* (refer to FIG. 3) which presses the outer circumferential surface of the holder 4. The annular pressing part 29*a* has a V-shape in a cross section taken along a plane containing the rotational axis line of the pressing roller 29.

The pressing rollers 29 move parallel to the center axis line AX when lowered along with the upper jig 17. In this stage, the outer circumferential surface of the holder 4 is pressed by the annular pressing parts 29a and the linear projection parts 14 are formed on the inner circumferential surface of the holder 4.

The pressing rollers 29 are provided such that their formation positions of the projection parts 14 are positions alternately displaced by a predetermined amount to one orientation and the other orientation in a circumferential direction C around the center axis line AX, with respect to the center positions of the corresponding recess parts 10. Thus, as in FIG. 3, the projection parts 14 are formed such that, in the recess part 10 of one divided core 3 out of the neighboring ones, the corresponding projection part 14 is in contact with the sidewall 10a, and in the recess part 10 of the other divided core 3, the corresponding projection part 14 is in contact with the sidewall 10b.

Moreover, a cylindrical fixing member 30 which fixes the holding parts 19 of the supporting mechanisms 18 from the inside such that they are positioned at predetermined positions in the radial direction R in the occasion of formation of the projection parts 14 with the pressing mechanisms 28, is provided in the upper jig 17. When the projection parts 14 are formed, the fixing member 30 is fitted inside the cylindrical surface constituted of the inner surfaces of the holding parts 19 in the radial direction R, and firmly maintains the positions of each of the holding parts 19 in the radial direction R against the pressing force by the pressing mechanisms 28.

Moreover, pressing members 31 which press, in the direction parallel to the center axis line AX, the end surfaces of the divided cores 3 perpendicular to the center axis line AX are provided in the upper jig 17. The pressing member 31 is attached to the upper jig 17 such that it can slide in the vertical direction, and is biased downward by a coil spring 32. When the projection parts 14 are formed by the pressing mechanisms 28, the pressing members 31 press the divided cores 3, and thereby, prevent the divided cores 3 from suffering distortion caused by pressing the holder 4 with the pressing rollers 29.

Figure 6:
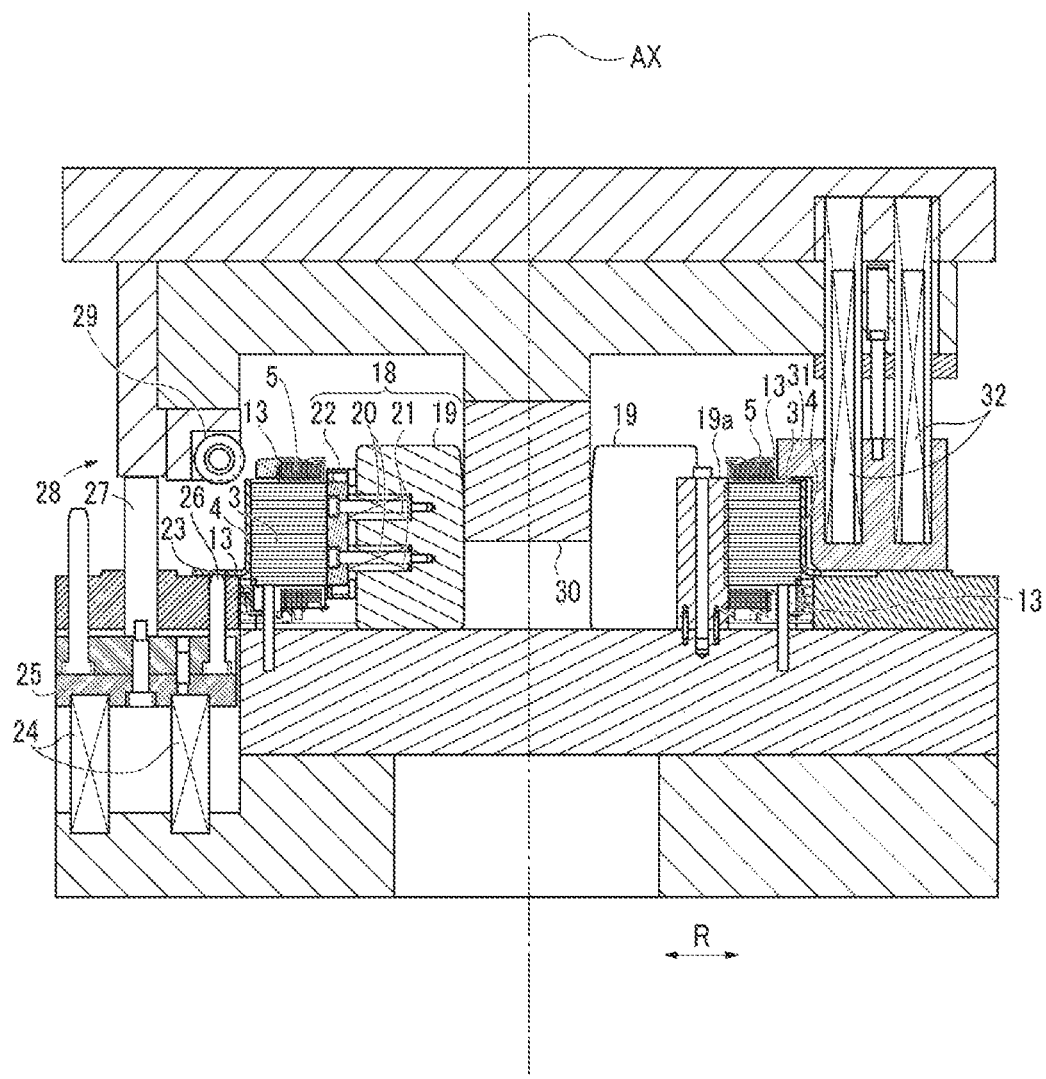
FIG. 6 is a cross-sectional view of the stator manufacturing apparatus in FIG. 4 in a different state from that of FIG. 5.

In this stage, the pressing members 31 stall to press the divided cores 3 immediately before start of the formation of the projection pans 14 as the upper jig 17 descends, as illustrated in FIG. 6. Then, the pressing force is increasing with the coil springs 32 as the formation of the projection parts 14 progresses, until completion of the formation of the projection parts 14 as illustrated in FIG. 7.

FIG. 8A to FIG. 8E illustrate state change of the supporting mechanisms 18, the pressing mechanisms 28, the divided cores 3 and the holder 4 in the occasion when the divided cores 3 and the holder 4 are integrated together by the stator manufacturing apparatus 15. FIG. 8A illustrates a state where the upper jig 17 is positioned at the processing standby position as in FIG. 5, and FIG. 8B a state where the upper jig 17 is positioned on the near side of the processing start position of the projection parts 14 as in FIG. 6.

Moreover, FIG. 8C illustrates a state where the upper jig 17 is positioned in the middle between the position in FIG. 6 and the lower limit position illustrated in FIG. 7, and FIG. 8D a state where the upper 17 is positioned at the lower limit position in FIG. 7. Moreover, FIG. 8E illustrates a state where the upper jig 17 is returned to the processing standby position.

When the divided cores 3 and the holder 4 are integrated together for manufacturing the stator 1, first, a holder disposing step is performed in which the holder 4 is disposed outside with respect to the arrangement of the divided cores 3 which is obtained by arranging the yoke parts 7 to annularly line up on the lower jig 16. In this stage, the upper jig 17 is positioned at the processing standby position as in FIG. 5.

On each divided core 3, the stator coil 5 is provided via the insulator 13. The disposition of the holder 4 is performed by inserting the tip parts of the two positioning pins 23 of the lower jig 16 into its two positioning holes 26. When the holder 4 has been disposed, as illustrated in FIG. 8A, gaps 33 are present between the divided cores 3 arranged on the lower jig 16 and the corresponding supporting mechanisms 18. Moreover, a gap 34 is present between the divided cores 3 and the holder 4.

Next, a projection part forming step of forming the projection parts 14 in the holder 4 is performed. Namely, first, the upper 17 is lowered from the processing standby position in FIG. 5. Then, when the upper jig 17 reaches the near side of the processing start position as in FIG. 6, the protruding members 27 are pressed downward by the pressing mechanisms 28 and the positioning pins 23 get out of the positioning holes 26 of the holder 4. Thus, the holder 4 is released from restraint with the positioning pins 23 and becomes able to displace in the horizontal plane to some extent.

In this stage, since the fixing member 30 is fitted into the interior of each of the holding parts 19, the supporting mechanisms 18 are pressed by the fixing member 30 and slightly move outward in the radial direction R as illustrated in FIG. 8B. Thus, the above-mentioned gaps 33 between the divided cores 3 and the supporting mechanisms 18 and the gap 34 between the divided cores 3 and the holder 4 become zero and are eliminated. Namely, the divided cores 3 are forced to take uniform postures without backlash with respect to the holder 4.

Moreover, thus, a gap 35 arises between the neighboring divided cores 3. In this stage, since the supporting pins 20 of the supporting mechanisms 18 are biased by the coil springs 21, they are apart outward in the radial direction R of the positions in the occasion when the divided cores 3 are prevented from moving by the preventing members 22. Moreover, in this stage, the pressing members 31 start to press the divided cores 3. This pressing force is increased until the upper jig 17 reaches the lower limit position.

Upon the upper jig 17 further descending, the pressing rollers 29 of each of the pressing mechanisms 28 are in contact with the upper end parts of the holder 4 which correspond to the recess parts 10 of each of the divided cores 3, and from those parts, the formation of the projection parts 14 by pressing the holder 4 starts.

Then, as the upper jig 17 descends toward the lower limit position in FIG. 7, the formation of the projection parts 14 with the pressing rollers 29 progresses. Along with this, as illustrated in FIG. 8C, the divided cores 3 are pressed and moved inward in the radial direction R with force F given via the holder 4, and the gap 35 between the neighboring divided cores 3 decreases. Moreover, due to the movement of the divided cores 3, the supporting pins 20 of the supporting mechanisms 18 are pressed inward in the radial direction R against the biasing force of the coil springs 21, and they reach the positions where the divided cores 3 are prevented from moving by the preventing members 22.

Then, when the upper jig 17 reaches the lower limit position as in FIG. 7, the gap 35 between the neighboring divided cores 3 is eliminated as illustrated in FIG. 8D. Moreover, a gap 36 arises between the recess parts 10 of the neighboring divided cores 3 and the corresponding inner circumferential surface of the holder 4. The gap 36 constitutes the above-mentioned gap d in FIG. 3.

Next, the upper jig 17 is returned to the upper processing standby position. In this stage, since pressing of the holding parts 19 of the supporting mechanisms 18 by the fixing member 30 is released, as in FIG. 8E, the supporting mechanisms 18 are returned to the initial positions in FIG. 8A. Moreover, in this stage, pressing the divided cores 3 by the pressing members 31 is released. Thus, the projection part forming step is completed and the divided cores 3 and the holder 4 are achieved to be integrated together.

According to the stator 1 of the embodiment, contact of the recess part 10 of the divided core 3 with the projected ridge 12 of the holder 4 is performed via a linear contact surface. Therefore, even when large torque is exerted on the divided cores 3, the divided cores 3 can be securely held by the holder 4 without slippage occurring between the divided cores 3 and the holder 4.

Moreover, since, in the sidewalls of the recess part 10 which the projection parts 14 are in contact, the sidewalls 10a and 10b on one side and the other side in the circumferential direction C are mixed, even when torque in any direction of one direction and the other direction in the circumferential direction C is exerted on the divided cores 3, the divided cores 3 can be securely held by the holder 4 without slippage occurring between the divided cores 3 and the holder 4.

Moreover, since the gap d is present between the portion on the opposite surfaces 8 between the recess parts 10 of the neighboring divided cores 3 and the corresponding inner circumferential surface of the holder 4, the pressing force inward in the radial direction R is not given to the corresponding portion on the outer circumferential surface. Therefore, deterioration of the performance of the stator 1 due to distortion in the divided cores 3 can be prevented.

Moreover, the recess part 10 of the divided core 3 is positioned at the center of the opposite surface 8 of the yoke part 7, that is, in the portion where the magnetic flux density is coarse. Therefore, even when distortion arises near the recess part 10 due to the formation of the projection parts 14 of the holder 4, deterioration of the performance of the stator 1 due to this can be prevented.

INDUSTRIAL APPLICABILITY

The stator of the present invention is formed by integrally holding the divided cores annularly arranged by the holder, and used for constituting a motor. Since the stator is formed as one firmly integrated in a simple step without the performance or the yield deteriorating, it can be used as being suitable for a motor to which large torque is given, such as a driving motor of vehicles.

REFERENCE SIGNS LIST

1 Stator
2 Stator core
3 Divided core
4 Holder
6 Teeth part
7 Yoke part
8 Opposite surface
9 Joint surface
10 Recess part
14 Projection part
d Gap

The invention claimed is:

1. A stator comprising:
a plurality of divided cores annularly arranged and forming a stator core; and
an annular holder disposed outside the stator core and integrally holding the plurality of divided cores,
wherein
each of the plurality of divided cores has an opposite surface opposing an inner circumferential surface of the holder, a joint surface provided to join to neighboring divided cores of the plurality of divided cores, and a recess part extending parallel to a center axis line of the stator core provided on the opposite surface, the recess part having a first sidewall and second sidewall which define a recess of recess part and are separated from each other in a circumferential direction of the stator core, with the first sidewall being disposed on a counterclockwise side of the recess of the recess part in the circumferential direction of the stator core, and the second sidewall being disposed on a clockwise side of the recess of the recess part in the circumferential direction of the stator core,
the holder includes projection parts provided on the inner circumferential surface of the holder, each of the projection parts entering the recess part of a respective one of the plurality of divided cores and formed so as to come into contact along an edge, on a side of the holder, of only one sidewall of the first sidewall and the second sidewall of the recess part of the respective one of the plurality of divided cores, with the other sidewall of the first sidewall and the second sidewall of the recess part of the respective one of the plurality of divided cores being spaced from and not in contact with the holder, and
the projection parts include a first group of projection parts which each contact only the first sidewall among the first sidewall and the second sidewall of the recess part of the respective one of the plurality of divided cores, and a second group of projection parts which each contact only the second sidewall among the first sidewall and the second sidewall of the recess part of the respective one of the plurality of divided cores, and the projection parts alternate in the circumferential direction of the stator core between projection parts of the first group and projection parts of the second group.

2. The stator according to claim 1, wherein the stator has a gap between a portion between each of the recess parts on the opposite surfaces of neighboring divided cores and the inner circumferential surface of the holder, which opposes the portion.

3. The stator according to claim 1, wherein
each of the plurality of divided cores has a teeth part which protrudes from a center part of the stator core in a circumferential direction toward a center axis line of the stator core and whose cross section perpendicular to the center axis line is a T-shape, and
the recess part is positioned in a center part of the opposite surface in each of the plurality of divided cores in the circumferential direction.

* * * * *